Figure 1:
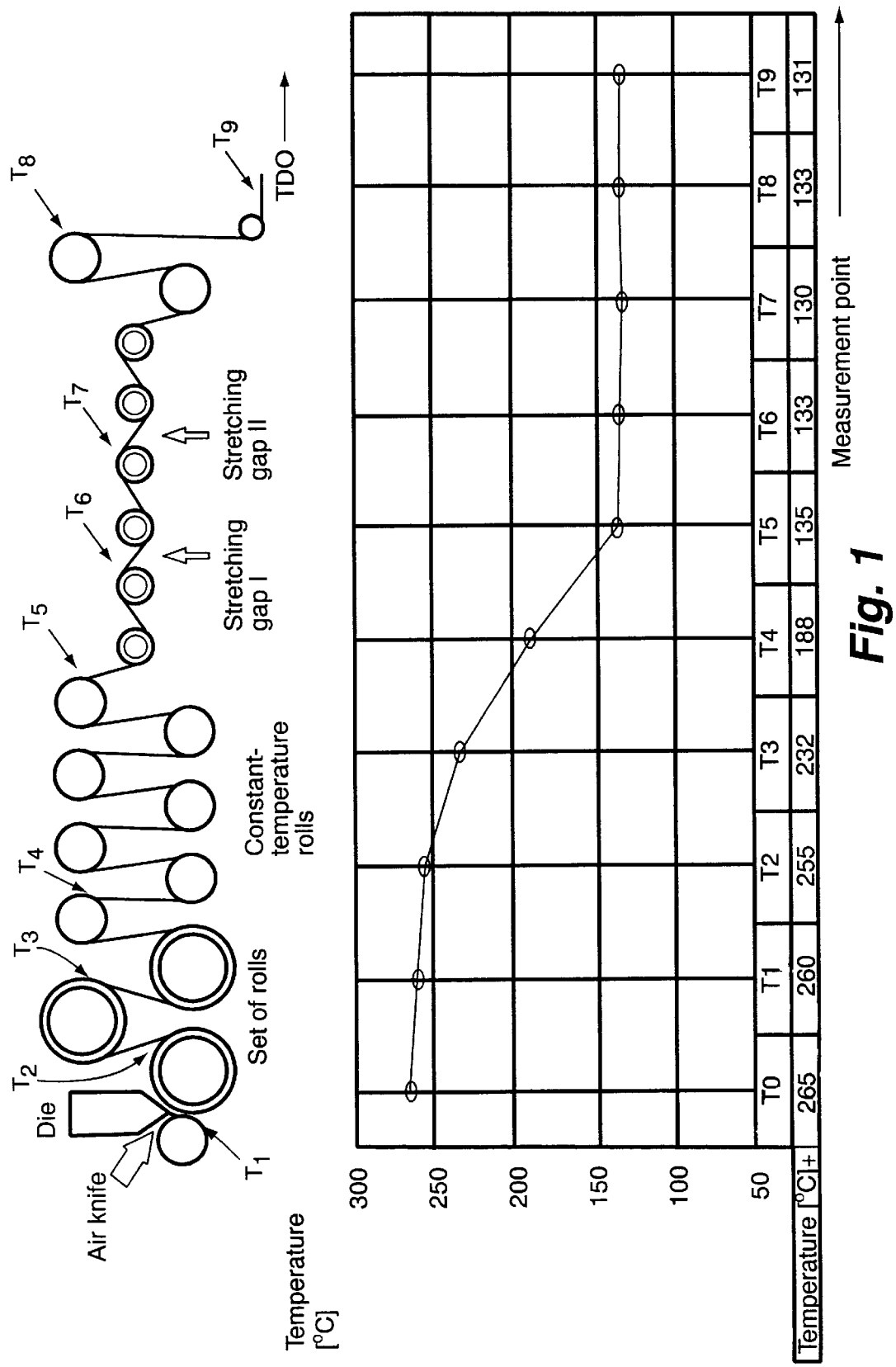

United States Patent

Eckart et al.

[11] Patent Number: 6,083,443
[45] Date of Patent: Jul. 4, 2000

[54] METHOD OF MANUFACTURING FILLER-CONTAINING POLYMER FILM SUITABLE FOR PRINTING ON

[75] Inventors: Ludwig Eckart; Ulrich Sahr, both of Traunstein; Klaus Stopperka, Dessau; Rainer Schwuchow, Grabenstätt, all of Germany

[73] Assignee: Bruckner Mashcinenbau GmbH, Siegsdorf, Germany

[21] Appl. No.: 09/000,259

[22] PCT Filed: May 22, 1997

[86] PCT No.: PCT/EP97/02629

§ 371 Date: Feb. 13, 1998

§ 102(e) Date: Feb. 13, 1998

[87] PCT Pub. No.: WO97/46367

PCT Pub. Date: Dec. 11, 1997

[30] Foreign Application Priority Data

May 31, 1996 [DE] Germany .................. 196 22 082

[51] Int. Cl.[7] .................. B29C 55/18; B29C 47/78
[52] U.S. Cl. .................. 264/173.14; 264/173.12; 264/173.18; 264/173.19; 264/211.12; 264/290.2; 264/210.1; 264/210.7
[58] Field of Search .................. 264/210.1, 210.6, 264/210.7, 211, 211.12, 290.2, 40.1, 237, 173.14, 173.19, 173.18, 173.12

[56] References Cited

U.S. PATENT DOCUMENTS

| | | | |
|---|---|---|---|
| 5,205,974 | 4/1993 | Bastiaansen et al. | 264/210.1 |
| 5,534,215 | 7/1996 | Song et al. | 264/345 |
| 5,552,011 | 9/1996 | Lin | 156/244.17 |
| 5,554,245 | 9/1996 | Schuhmann et al. | 156/244.24 |
| 5,723,088 | 3/1998 | Murschall et al. | 264/469 |
| 5,750,645 | 5/1998 | Huang | 528/502 B |
| 5,833,904 | 11/1998 | Muskalla et al. | 264/178 R |
| 5,925,208 | 7/1999 | Dronzek, Jr. | 156/257 |

FOREIGN PATENT DOCUMENTS

| | | |
|---|---|---|
| 0 408 971 A2 | 1/1991 | European Pat. Off. . |
| 14 94 187 | 1/1969 | Germany . |
| 24 58 822 | 6/1975 | Germany . |
| 25 28 563 | 1/1976 | Germany . |
| 27 40 237 | 3/1978 | Germany . |

*Primary Examiner*—Jan H. Silbaugh
*Assistant Examiner*—Mark Eashoo
*Attorney, Agent, or Firm*—Nixon & Vanderhye

[57] ABSTRACT

A pigmented, printable, biaxially oriented polymer film, also known as a synthetic paper, having one or more layers, is produced by (1) extruding a melt of a mixture made from crystallizable film-forming polymers, pigments or fillers, (2) allowing the extruded melt with pigments and fillers embedded in it to harden while controlling the temperature and thickness of the primary film produced followed by biaxial orientation and cooling. During this process, the temperature of the primary film is controlled in a range between its solidifying point and the temperature required for orientation such that the primary film is never cooled to a temperature below that required for orientation. Also the interval between solidification and orientation process is selected to allow crystallization of the film-forming polymer between the embedded particles of filler and pigment before orientation.

10 Claims, 4 Drawing Sheets

A: Chill roll with water bath; thickness of the cast film: <1.0 mm
B: Arrangement with set of rolls; thickness of the cast film: 1.0 - 5.5 mm

METHOD OF MANUFACTURING FILLER-CONTAINING POLYMER FILM SUITABLE FOR PRINTING ON

The invention relates to a process for direct production of a printable, biaxially oriented polymer film containing filler and/or pigment and having one or more layers, in particular a film based on polypropylene, with a thickness of up to 250 μm.

Films which, due to high proportions of fillers and/or pigments and also due to controlled creation of microscopic vacuoles in the film, are opaque and in addition are inscribable and printable are also known as "synthetic papers". The term "synthetic paper" is also used as a technical term for papers produced by the traditional processes of papermaking using fibers from synthetic materials, but the present application does not concern such papers. For the purposes of the present invention and with regard to the end application, "synthetic paper" of film type is needed as relatively thick films, the usual current production qualities having thicknesses in the range from 60 to 250 μm. "Synthetic paper" of film type is generally based on polypropylene as film-forming polymer, and the explanations below therefore refer in particular to polypropylene films. For the purposes of the present patent application, "polypropylene" here is a crystallizable tactic polypropylene, in particular an isotactic, homopolymeric polypropylene, but the term also includes a use or inclusion of syndiotactic polypropylene and of copolymers which are composed predominantly of propylene units and, if desired, may contain up to 15% by weight of other olefins, such as ethylene and α-olefins having from 4 to 8 carbon atoms, in particular for top layers which are formed by coextrusion. Insofar as the teaching of the present invention can be extended to other polymers, a matter which in any particular case can be judged by the person skilled in the art using his technical knowledge, other polymers than polypropylene are also encompassed in the more general aspects of the teaching of the present invention.

Currently, polypropylene-based "synthetic paper" is fundamentally produced by processes, and using plants, which are usual for producing polypropylene films for other applications, e.g. for producing transparent polypropylene films. However, since biaxially orientated polypropylene films for other applications are usually needed and produced at lower thicknesses than that of "synthetic paper", the production of "synthetic paper" of greater thickness requires, following the usual production of polypropylene films, the creation of the final film thickness by means of downstream lamination steps, i.e. the combination of more than one film layer. This consumes effort and cost, but hitherto has been regarded as unavoidable.

The process for producing polypropylene films also used for producing highly filled and highly pigmented polypropylene films forming the basis of prior art "synthetic papers" of film type includes the following fundamental steps:

A melt of the film-forming polymer, to which are added, if desired, additives for improving processing or handling of the finished film, is produced and, in the case of production of a single-layer film, extruded through a single slot die. In the case of production of a film having more than one layer, coextrusion takes place through two or more slot dies. If a filled and pigmented film is desired, the fillers and/or pigments are incorporated in a known manner into the melt, the starting material frequently being a premix of pigmented and/or filled granules (termed masterbatches) with pure polymer granules.

In an alternative procedure, termed "direct addition", as described in German Patent Application 196 04 637.8, the use of masterbatches is dispensed with. Instead, the pigments, in particular the surface-treated fillers and/or pigments described below, are added to the melt in a twin-screw extruder and devolatilized and homogenized during extrusion.

The fillers and/or pigments used are finely divided powders of inorganic materials, such as $SiO_2$, calcium carbonate, dolomite, titanium dioxide, kaolin, talc, barium sulphate, zinc sulphide, lithopones or mixtures of these, all of which may also be used for the purposes of the present invention. In the present application, the terms "fillers" and "pigments" are generally used interchangeably and essentially signify the same constituents, even if the specific selection of material in an individual case may be made by the person skilled in the art taking into account particular properties of the particles.

The melt is extruded through the slot die(s) onto a "chill roll" to give a "cast film", the film hardening as a result of relatively severe and sudden cooling on the chill roll. In the case of polypropylene film production for example, the cooling is brought about by using the chill roll in association with a water bath, and then cooling the film with air to produce the actual primary film for subsequent further processing, the temperature of the film being lowered to about 70° C. However, for the subsequent biaxial orientation process, the quenched film obtained must now be brought to a condition in which it has the required degree of crystallization, and also the temperature required for the subsequent orientation process. In the traditional process and using the traditional polypropylene prepared using Ziegler-Natta catalysts, this is done by reheating the previously cooled film to the orientation process temperature, which is of the order of at least 120° C. If a polypropylene is used which has been prepared by polymerization using metallocene catalysts, lower orientation process temperatures in the range from 110 to 115° C. may be used. Since polypropylene, in particular a homopolymeric isotactic polypropylene, crystallizes relatively readily, so that a degree of crystallization of the order of 65% and above can be achieved, and on the other hand, however, the rate of crystallization of polypropylene is relatively low, (crystallite growth, without nucleation, of the order of 0.33 μm/s), the reheated film has to be given sufficient time for the degree of crystallization to be achieved which is required for the subsequent orientation process. This is done by conducting the film, before the orientation process, over more than one constant-temperature roll on which, besides the crystallization of the film, there is also an evening out of temperature and tension within the film. Of course, the thicker the particular primary film, the longer these procedures take, and therefore plant and process give rise to practical upper limits on the possible thickness of the primary film. That is one of the reasons for the necessity hitherto of resorting to subsequent lamination to create thick "synthetic papers".

The process for producing a polypropylene film is concluded by orientating the primary film in a manner known per se, either biaxially in longitudinal and transverse directions in sequence one after the other or simultaneously in both directions at the same time, and obtaining the finished biaxially oriented polypropylene film having one or more layers after cooling and normally winding it up to give a roll. The purpose here of the process referred to simply as "cooling" is not only to lower the film temperature, but also to heat-set its internal structure, and also to even out tension by conditioning.

The traditional process has a large number of disadvantages for producing filled and pigmented biaxially oriented polypropylene films:

A fundamental disadvantage is that in the traditional process it is not possible to produce "synthetic papers" in the thickness range from 60 to 250 μm directly in one production step from the melt to the finished biaxially oriented film. A further disadvantage of the traditional process is its relatively high energy usage, increased by the quenching of the cast film and its subsequent reheating, which "lose energy" and have very high energy consumption. The required lamination step also not only consumes effort but also requires renewed input of energy as well as additional investment.

Some prior art polypropylene-based "synthetic papers" moreover also have the further disadvantage that the filler particles and pigment particles in the surface of the film are not bound very firmly into the polymer matrix, and this can become evident as the phenomenon termed "chalking". Although the filler particles and pigment particles are vital for the printability and inscribability of the film, and there is a correlation between the amount of these and the print quality, these considerations place a certain practical upper limit on the proportion of filler and pigment in conventional polypropylene-based "synthetic papers".

For the prior art, further reference is also made in particular to EP 0 004 633 B2, EP 0 220 433 B1 and FR-A-2 276 349, and also to the literature references cited as prior art therein.

DE-A-44 13 363 moreover discloses that, during production of a monoaxially oriented polypropylene film with no filler content, the orientation process can be carried out in a manner unlike the conventional method of operation, by cooling the cast film on the chill roll only as far as the temperature range of crystallization, and then orienting it directly. However, because of the relatively low rate of crystallization of a polypropylene film, it is likely that the process can be carried out under practical conditions with at best a very low film speed and/or film thickness.

Considering the disadvantages of the prior art which have been described, it is an object of the present invention to provide a process for producing a filled and/or pigmented, printable biaxially oriented polymer film having one or more layers, in particular a polypropylene film, which process makes it possible to produce such a film with a thickness of up to 250 μm directly without lamination and in addition features reduced energy usage and makes it possible to produce a high-quality "synthetic paper" with a high proportion of filler and/or pigment at least in the surface layer to be printed or inscribed.

According to the invention, this object is achieved by means of a process which encompasses the process steps known per se according to the precharacterizing clause of claim 1, by controlling and/or regulating the temperature of the primary film in the range between its solidification point and the temperature required for the orientation process in such a manner that the primary film is never cooled to a temperature below that required for the orientation process and the interval between the solidification and the orientation process is selected such that the crystallization of the film-forming polymer between the embedded particles of filler and pigment is essentially concluded before the orientation process.

Advantageous embodiments of apparatus for this basic process are laid out in subclaims 2 and 3, and preferred embodiments of the novel process in relation to the production of polypropylene-based films are given in subclaims 4 to 9.

The present invention is illustrated below with still further details of plant engineering and film formulations, with reference to the figures, express reference being made to the clear technical content disclosed in the figures which supplements the descriptions of the text below.

Figure 2:
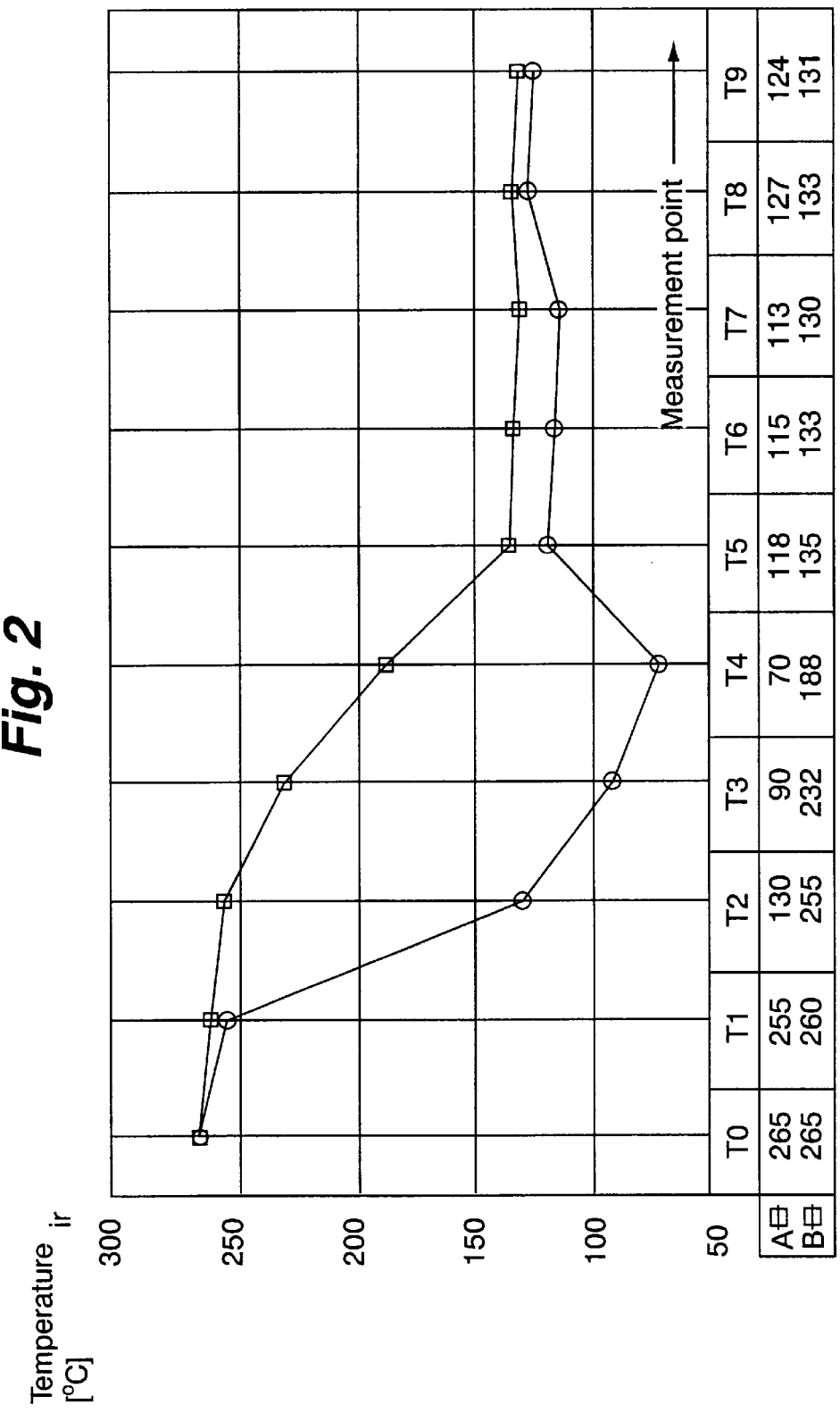
Figure 3:
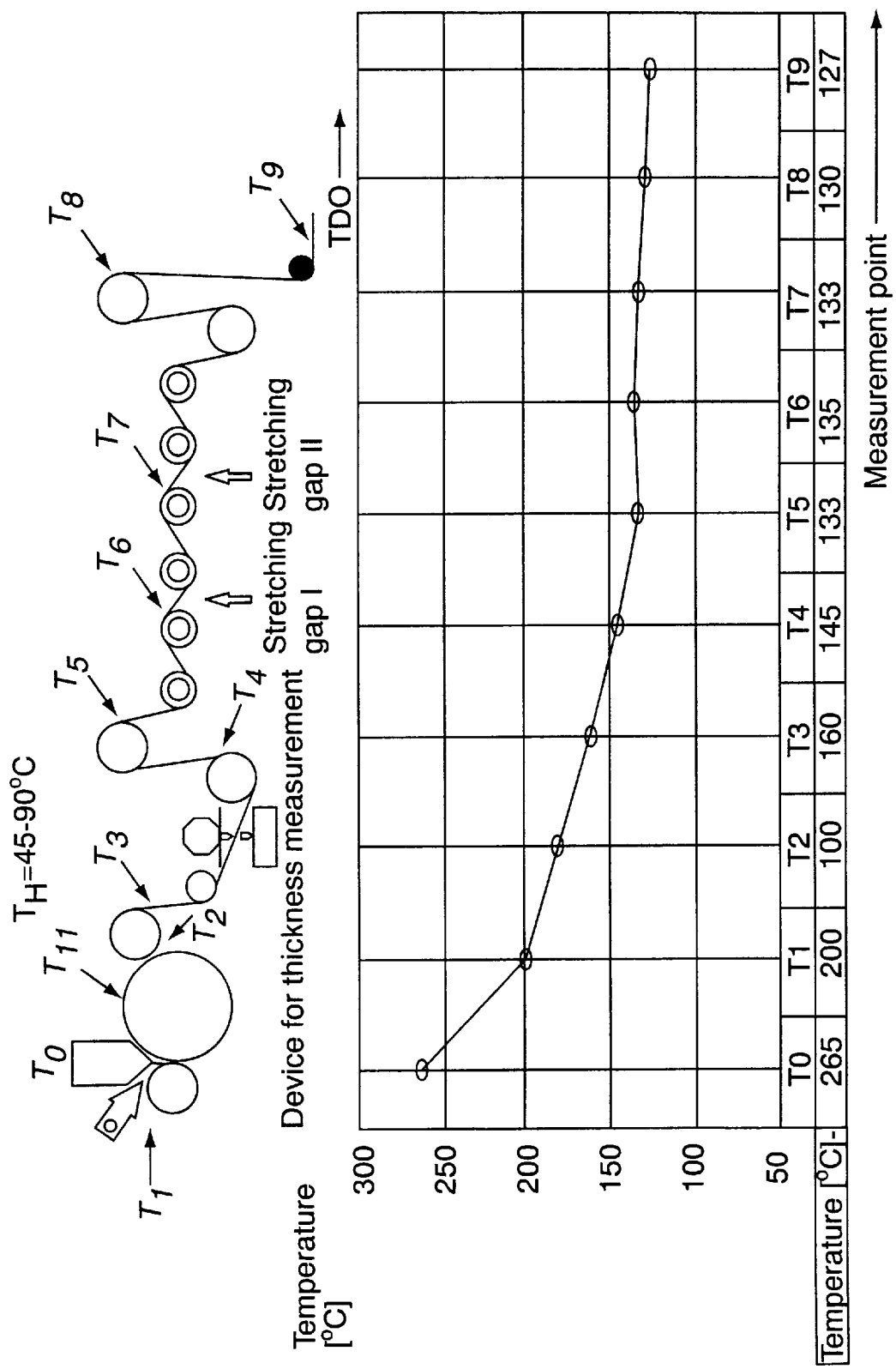
Figure 4:
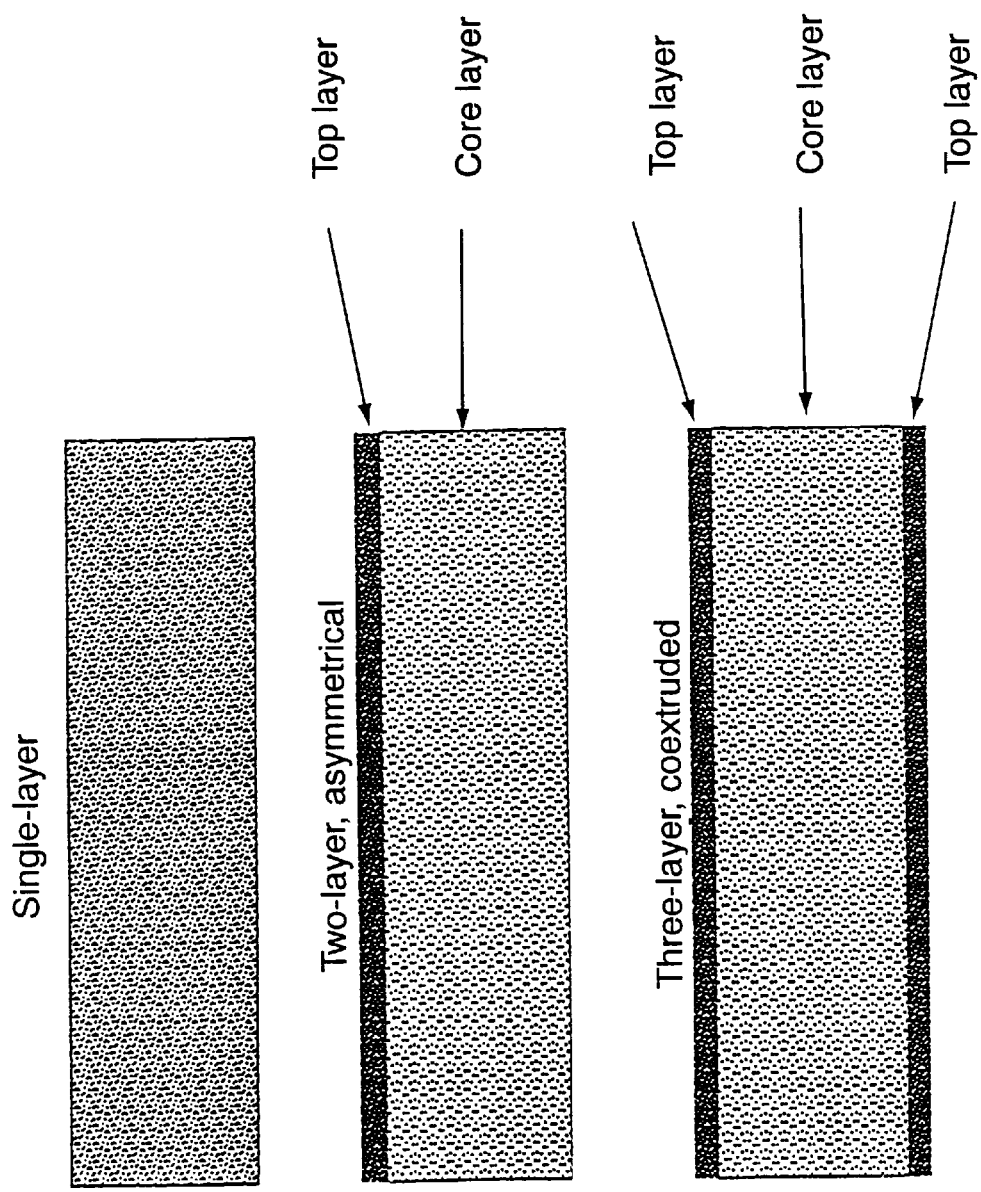

FIG. 1: shows a diagram of a first embodiment of the novel process using a set of rolls, together with an associated temperature profile for the film temperature;

FIG. 2: shows a diagram comparing the temperature curve for a film being produced by the novel process shown in FIG. 1 and by a traditional process;

FIG. 3: shows a diagram of a second embodiment of the novel process for lower film thicknesses using a chill roll without water bath, together with an associated temperature profile for the film temperature;

FIG. 4: shows a diagram of the fundamental construction of single-, two- and three-layer films according to the invention.

The novel process derives from the realization, which cannot be gained as such from the prior art, that filled and pigmented primary films, in particular polypropylene films, differ so strongly from "normal" polypropylene films, i.e. those containing no fillers, in a large number of important properties to the extent that, while retaining process engineering and plant engineering parameters which are close to present practice, the films may be produced by a process which differs in a number of important steps from the traditional process for producing a biaxially oriented polypropylene film.

Indeed, it has become apparent that the intrinsic properties of the primary film, altered by the presence of large amounts of fillers and pigments, can be utilized advantageously in the sense that it is possible to produce a very much thicker primary film than in the case of pure polypropylene if together with this, and with additional energy saving, the usual cooling and heating step is dispensed with and the primary film is controlled "from the top downward", i.e. cooling from the solidification point of the melt, which is of the order of about 250° C., directly and gradually to a temperature at which the primary film can be fed to the first orientation process, that is to say a temperature of from about 130 to 135° C. when Ziegler-Natta polypropylene is used. With homopolymeric polypropylenes which can be prepared using metallocene catalysts and can have a crystalline melting point of, for example, about 145° C., the primary films are cooled as far as to from 110 to 115° C. before entering the stretching gap. Ensuring that the temperature of the primary film before the orientation process does not pass through a temperature minimum with temperatures below the orientation temperature avoids internal stresses which can be observed in particular when relatively thick films are quenched, allowing good evening-out of tensions and temperatures even within a relatively thick film, and the presence of the filler particles, which act as nuclei for crystallization, brings about rapid and complete crystallization of the propylene polymer once the temperature range is reached in which the film crystallizes, so that the primary film can be directly biaxially oriented in the longitudinal direction and then in the transverse direction, or simultaneously in both directions. By processing an orientable primary film of thickness from 2.0 to 6.0 mm in the manner according to the invention, it is possible to produce a polypropylene-based "synthetic paper" in a thickness of from 60 to 250 μm directly.

From a plant engineering point of view, the novel process allows the usual chill roll to be replaced by a set of rolls with constant-temperature rolls. By conducting the primary film created from the melt through the gap of a set of rolls, to which may be attached further roll gaps for calibrating the film thickness and evening-out the temperature, the primary film is cooled uniformly, the temperature not passing through any significant minima, and without build-up and locking-in of internal tensions, as far as the particular temperature range within which the film crystallizes. The degree of crystallization required for the orientation process is achieved in a relatively short time or with the usual primary film speeds in the range of from 30 to 70 m/min, over a relatively short path which does not give problems of any type in the dimensioning of the plant.

FIG. 1 shows a diagram of the version of the process just described, using a set of rolls, together with an associated temperature profile for the film temperature, for the use of polypropylene which has been prepared using Ziegler-Natta catalysts. When use is made of polypropylene which has been prepared using metallocene catalysts, the temperatures in the range T5 to T9 can be lowered as far as 110° C. or 115° C. A process of the type shown may be carried out, for example, by passing a primary film with a thickness of 5.4 mm and a take-off speed of 11.5 m/min to the orientation process and, after biaxial orientation, winding up a finished film of a thickness of 0.20 mm with a speed of 53 m/min.

In particular when biaxial orientation is used to produce a "synthetic paper" of relatively low thickness from relatively thin primary films in the thickness range from 0.6 to 2.0 mm, "top-down" cooling can also be achieved by equipment modified from the traditional process using a chill roll, by, for example, omitting the water bath and correspondingly keeping up the temperature of the chill roll so that the film temperature likewise does not pass through any minimum temperature until it achieves the orientation process temperature of from 130 to 135° C. or from 110 to 115° C. Such a version of the process is shown in FIG. 2, together with the associated temperature profile for the film temperature. "Film temperature" here is the term used for the temperature profile across the film thickness. It should be distinguished from "contact temperature" which is the term used for the temperature of the roll or of the air on the other side from the roll. It will be realized here that in this version of the process a lower number of constant-temperature rolls is required than in the conventional process to bring the film into the stretching gap at a sufficient temperature. For carrying out this version of the process, the temperature of the chill roll, with the usual cast film speeds of from 30 to 70 m/min, is adjusted to a temperature in the range from 45 to 90° C., so that contact with this chill roll brings about cooling of the film by less than 100° C., only to about 180° C. Further controlled cooling is achieved by conducting the film over temperature-controlled constant-temperature rolls and monitoring the thickness of the film, which is important in relation to the cooling speed and the required time used for evening-out the internal temperatures and tensions.

The novel process derives from utilizing the fact that the presence of fillers and/or pigments, which fundamentally may be any of the usual fillers and pigments mentioned above, finely divided lithopones, calcium carbonate and titanium dioxide being preferred, markedly increases the recrystallization temperature in comparison with pure polypropylene.

By using suitable additives to maintain a very high rate of crystallization of the polypropylene between the filler particles, it is also ensured that the degree of crystallization required for the orientation process can be achieved rapidly, without the occurrence of any sizable plant engineering problems. An additive which has an advantageous effect on the execution of the novel process is a polypropylene wax, if it is added in amounts in the range from about 5 to 10% by weight, based on all of the film-forming constituents. Particular preference is given to the use of a relatively high-molecular-weight polypropylene wax ("PP wax") with a molecular weight (weight-average molecular weight $M_w$) of more than 8000 g/mol, in particular in the range from 12,000 to 50,000 g/mol. Two suitable types of polypropylene wax which are currently preferred are types A and B below, the most significant properties of which are:

| Type A: | homopolymeric polypropylene wax molar mass $M_w$ about 36,000 g/mol crystallinity: 55.6% (differential scanning calorimetry, DSC) crystallinity: 70% (X-ray analysis) melting point $F_m$ (DSC): 158–162° C. drop point (Ubbelohde): 165–170° C. melt viscosity (200° C.): 800–1200 mm²/s crystallization temperature $T_{rec}$: 114° C. |
|---|---|
| Type B: | homopolymeric polypropylene wax molar mass $M_w$ about 17,000 g/mol crystallinity: 47.5% (DSC) crystallinity: 65% (X-ray analysis) melting point $F_m$ (DSC): 156–160° C. drop point (Ubbelohde): 158–165° C. melt viscosity (200° C.): 90–125 mm²/s crystallization temperature $T_{rec}$: 110° C. |

The presence, in the film, of the polypropylene wax mentioned has the effect of reducing viscosity, and this has an advantageous effect in relation to the wetting and therefore the embedding of the pigment particles and brings about easier movement of the crystallizing polypropylene macromolecules, resulting in a higher rate of crystallization below the recrystallization temperature of about 135° C. or about 110° C.

It is known that, during biaxial orientation of filled polypropylene, microscopic vacuoles form within the film, beginning at the interface of polymer and filler particles, and these increase the opacity of the film and, in combination with the filler particles, give rise to the opaque character eventually obtained in the film. The vacuoles can arise because the filler particles and pigment particles are relatively weakly bound in the polymer matrix, i.e. are bound to the polymer matrix only by secondary valencies and on occasions by hydrogen bonds. Although the formation of the vacuoles in the interior of the film is desirable, in the region of the surface it has the disadvantage that the weak binding of the filler particles and pigments particles gives an unsatisfactory quality of surface, evident in particular as greater susceptibility to abrasion ("chalking"). According to the invention, this disadvantage can be counteracted by additionally binding the filler particles covalently to the polymer matrix by means of suitable additives. A suitable additive for a polypropylene film is, for example, a polypropylene wax grafted with maleic anhydride ("MA PP wax").

Such an MA PP wax which is suitable and currently preferred has the following properties:

| melting point (differential scanning calorimetry, DSC): | 155–156° C. |
|---|---|
| drop point (Ubbelohde method): | 162–165° C. |
| ball indentation hardness at 23° C.: | 1474–1480 bar |
| melt viscosity (at 190° C.): | 143–145 mm²/s |
| maleic anhydride content: | 2.0–2.5% by weight |

| average molecular weight | |
| --- | --- |
| weight average $M_w$: | 19,800 g/mol |
| number average $M_n$: | 9600 |

The maleic anhydride moiety of the grafted polypropylene wax can react similarly to an acid function with the filler particles and pigment particles and bind these in covalently. This gives a great improvement in the adhesion of the filler particles and pigment particles, because they are much more strongly bound in. This gives higher resistance to abrasion, improved surface roughness, better wettability of the surface, improved print resolution capability and increased flexural stiffness of the film.

Since the advantages of adding an MA PP wax have effect in particular at the surface of the film, the MA PP wax is in particular added to the particular polymer layers which form the surfaces capable of being printed and inscribed. It is particularly advantageous here to add the MA PP wax to one or two relatively thin top layers, which in the novel process can be created by coextrusion. In such a case, the core layer can have the desired capability of forming vacuoles without the appearance of disadvantages for surface quality. However, addition of the MA PP wax can also be advantageous in single-layer, thick pigmented polypropylene films because surface quality is improved, an effect which can give better printability, and the stronger binding-in of the pigment particles allows greater addition of pigment particles without a simultaneous disadvantageous effect on abrasion resistance. The higher proportion of pigment reduces the importance of vacuoles for the opacity of the film. The increased flexural stiffness of the film resulting from the stronger binding-in of the filler particles can be a further advantage for particular applications.

Advantageous formulations for films having one and more than one (two and three) layers, as in the diagram of FIG. 3, and suitable for carrying out the novel process are described below.

EXAMPLE 1

A composition for producing a single-layer film by the novel process comprises:

| | |
| --- | --- |
| 60.0 | % by weight of isotactic polypropylene having a molecular weight ($M_w$) of about 300,000 g/mol, |
| 25 | % by weight of $CaCO_3$, |
| 7.0 | % by weight of $TiO_2$ |
| 0.5 | % by weight of MA PP wax |
| 7.5 | % by weight of PP wax type A |

The constituent $CaCO_3$ here may also be replaced by the same proportion of, for example, lithopones.

The calcium carbonate was used as a fine powder with a particle size distribution in the range from 0.2 to 16 µm with a maximum of the particle size distribution at about 3 µm.

The titanium dioxide had a particle size in the range from 0.18 to 1.8 µm, a maximum of the particle size distribution being at about 0.5 µm.

EXAMPLE 2

To produce a two-layer film with a core layer and a single, asymmetrically arranged coextruded top layer having a thickness of about 10% of the entire films [sic], the following compositions were used:

| | |
| --- | --- |
| core layer: | 77.5% by weight of polypropylene |
| | 15.0% by weight of calcium carbonate (or lithopones, $BaSO_4$ or talc) |
| | 2.5% by weight of $TiO_2$ |
| | 5.0% by weight of PP wax |
| top layer: | 57.0% by weight of polypropylene |
| | 27.5% by weight of $CaCO_3$ (or lithopones) |
| | 7.5% by weight of $TiO_2$ |
| | 0.5% by weight of MA PP wax |
| | 7.5% by weight of PP wax |

Using the same composition for the core layer and the top layers, it is also possible to produce a three-layer coextruded film with two top layers, the top layers having thicknesses which together make up from about 6 to 15% of the entire film.

What is claimed is:

1. A process for producing a pigmented, printable, biaxially oriented polymer film having one or more layers, by
   (a) extruding a melt comprising a mixture of at least one crystallizable film-forming polymer, pigments, fillers, or both pigments and fillers, and optionally an additive, through one or more slot dies;
   (b) allowing the extruded melt to solidify into a primary film having pigments, fillers, or both pigments and fillers, embedded therein while controlling the temperature and thickness of the resultant primary film to a degree of crystallization required for subsequent processing;
   (c) biaxially orienting the primary film in longitudinal and transverse directions, either in sequence one after the other or simultaneously; and
   (d) cooling, thereby obtaining a biaxially oriented film having one or more layers, wherein a temperature of the primary film is controlled prior to step (c) in a range between the primary film's solidifying point and a temperature required for biaxial orientation process step (c) in such a manner that the primary film is never cooled to a temperature below that required for biaxial orientation and the interval between solidification and biaxial orientation is selected such that crystallization of the film-forming polymer between the embedded particles of filler and pigment is essentially concluded before the orientation process.

2. The process according to claim 1, wherein that, to produce a pigmented, printable biaxially oriented polymer film with a thickness in the range from 60 to 250 µm, the temperature of the primary film is controlled between solidification and the biaxial orientation process the primary film is passed through a gap between at least one set of heated rolls.

3. The process of claim 2 including, subsequent to the heated rolls, passing the primary film over constant-temperature rolls.

4. The process according to claim 1, wherein to produce a film of thickness up to 250 µm, the temperature of the primary film between solidification and orientation is controlled by contacting the primary film with a cooling roll thereby cooling the primary film prior to biaxial orientation to a temperature which is from 50 to 80° C. above that required for subsequent orientation step (c).

5. The process according to claim 1 wherein the crystallizable film-forming polymer is a propylene polymer which contains from 10 to 40% by weight, based on the total of all film-forming constituents, of a filler, pigment, or both filler and pigment selected from the group consisting of finely divided calcium carbonate, dolomite, $SiO_2$, titanium dioxide, kaolin, talc, barium sulphate, lithopone and mixtures thereof.

6. The process according to claim 5 wherein the pigmented printable, biaxially oriented polymer film produced is a single-layer film of thickness from 60 to 250 μm made from a crystallizable polypropylene homopolymer which contains, based in each case on the total weight of all film constituents, from 20 to 35% by weight of pigment, from 5 to 10% by weight of an isotactic polypropylene wax and also from 0.2 to 1.0% by weight of a polypropylene wax grafted with maleic anhydride.

7. The process according to claim 1, wherein the film-forming polymer is a crystallizable polypropylene homopolymer which when extruded contains, as pigments, calcium carbonate and titanium dioxide, and also a polypropylene wax as an additive in amounts of from 4 to 8% by weight, based on the total weight of the primary film, and the primary film is cooled in such a manner that the primary film is oriented at a temperature of from 130 to 135° C. or from 110 to 115° C. within a period of from 1 to 100 seconds at a primary film speed in the range from 10 to 70 m/min.

8. The process according to claim 7 wherein the pigment or filler is calcium carbonate, lithopone, titanium dioxide or mixtures thereof and the polypropylene wax is isotactic, has a weight-average molecular weight $M_W$ in the range from 12,000 to 50,000 g/mol and is used in amounts of from 5 to 7.5% by weight.

9. The process according to claim 1 wherein the primary film is intended for subsequent printing and contains, as an additive, a polypropylene wax grafted with maleic anhydride in an amount of from 0.3 to 0.8% by weight, based on the total weight of the primary film layer.

10. The process according to claim 9 wherein the pigmented printable, biaxially oriented polymer film is a two-or three-layer film of thickness from 60 to 250 μm with a core layer made from a crystallizable polypropylene homopolymer which contains, based on the total weight of all of the film constituents forming the core layer, from 12.5 to 30% by weight of pigment and from 5 to 10% by weight of an isotactic polypropylene wax, and one or two coextruded outer, printable top layers made from a crystallizable polypropylene homopolymer, which contain, based in each case on the total weight of all of the film constituents forming the top layer, from 25 to 35% by weight of pigment, from 4 to 10% by weight of an isotactic polypropylene wax, and also from 0.2 to 1.0% by weight of a polypropylene wax grafted with maleic anhydride, the thickness of the core layer being from 60 to 98% of the thickness of the entire pigmented, printable, biaxially oriented polymer film.

* * * * *